(12) United States Patent
Gärtner

(10) Patent No.: US 6,276,719 B1
(45) Date of Patent: Aug. 21, 2001

(54) LOCKING DEVICE FOR RELEASABLY SECURING AN ADJUSTABLE STEERING COLUMN TO A MOTOR VEHICLE AND METHOD OF MAKING AND USING SAME

(75) Inventor: Stephan Gärtner, Hamburg (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/385,371

(22) Filed: Aug. 30, 1999

(30) Foreign Application Priority Data

Aug. 29, 1998 (DE) .............................................. 198 39 527

(51) Int. Cl.⁷ ....................................................... B62D 1/18
(52) U.S. Cl. .............................. 280/775; 74/493; 74/531; 188/67
(58) Field of Search ............................... 280/775; 74/493, 74/531; 188/67, 371

(56) References Cited

U.S. PATENT DOCUMENTS

| | | | |
|---|---|---|---|
| 4,041,796 | * 8/1977 | Shishido | ................................. 74/493 |
| 5,148,717 | * 9/1992 | Yamaguchi | ........................... 280/775 |
| 5,161,425 | * 11/1992 | Baskett et al. | ......................... 74/493 |
| 5,524,927 | * 6/1996 | Toussaint | ............................... 280/777 |
| 5,562,307 | * 10/1996 | Connor | ................................. 280/777 |
| 5,979,265 | * 11/1999 | Kim et al. | .............................. 74/493 |
| 6,039,350 | * 3/2000 | Patzelt et al. | ......................... 280/775 |

FOREIGN PATENT DOCUMENTS

| | | |
|---|---|---|
| 0440 403 B1 | 12/1993 | (DE) . |
| 58-60569 | 4/1983 | (JP) . |
| 63-117662 | 7/1988 | (JP) . |
| 2-115759 | 9/1990 | (JP) . |

* cited by examiner

*Primary Examiner*—Kenneth R. Rice
*Assistant Examiner*—Lynda Jasmin
(74) *Attorney, Agent, or Firm*—Crowell & Moring, L.L.P.

(57) ABSTRACT

A locking device for releasably securing an adjustable steering column to a motor-vehicle body. The locking device comprises two locking elements where one of the two locking elements is attached to the steering column and the other is attached the motor-vehicle body. The two locking elements are adjustable in relation to each other between a release position, which allows the steering column to be adjusted, and a locking position, which secures the steering column. One of the two locking elements is designed as an elastically ductile deformation element that can be deformed in the locking position by means of the other locking element with resultant force and/or form locking of the steering column to the motor-vehicle body. Methods are also provided for making and using same.

29 Claims, 2 Drawing Sheets

LOCKING DEVICE FOR RELEASABLY SECURING AN ADJUSTABLE STEERING COLUMN TO A MOTOR VEHICLE AND METHOD OF MAKING AND USING SAME

BACKGROUND AND SUMMARY OF THE INVENTION

This application claims the priority of German application 198 39 527.2, filed Aug. 29, 1998, the disclosure of which is expressly incorporated by reference herein.

The invention relates to a locking device for a steering column for a motor vehicle. The steering column is arranged such that it can be adjusted with respect to the motor-vehicle body and has a locking device for releasably securing the steering column to the motor-vehicle body, which device comprises a first locking element on the steering column and a second locking element on the body, the two elements being able to be adjusted in relation to the other in a release position, which allows the steering column to be adjusted, and in a locking position, which secures the steering column. The invention also relates to methods for making and using the above-mentioned locking device.

Patent document EP 0 440 403 B1 discloses a steering column for a motor vehicle, which is secured releasably to the motor-vehicle body via an adjustable locking device. The locking device comprises a mounting which is secured on the body and has a tooth arrangement and a locking element which can be moved in the mounting and has a corresponding tooth arrangement. The moveable locking element is connected to the steering column via at least two connecting elements. Parts of it are of resilient design such that it can be brought, via a lever, into engagement with the tooth arrangement on the mounting secured on the body and can automatically lift itself off the tooth arrangement. The locking device therefore permits the steering column to be adjusted, in particular transversely to the axial direction of the steering column, in a stepped manner corresponding to the tooth width of the toothing. The number of possible latching positions of the locking device is determined by the number of engagement possibilities of the toothing.

The object of the invention is to provide a steering column of the type mentioned at the beginning which can be adjusted in an infinitely variable manner with respect to the motor-vehicle body, and whose locking device is of particularly simple design.

This object is achieved in that at least one of the locking elements is designed as an elastically ductile deformation element which can be deformed in the locking position by means of the other locking element with resultant force or form locking of the steering column to the vehicle body. The elastic deformability of at least one locking element makes it possible for a reversible contact to take place between said locking element, which is designed as the deformation element, and the further locking element or the steering column or motor-vehicle body. The homogeneous ductile behavior of the deformation element means that the steering column is able to be secured with respect to the motor-vehicle body in an infinitely variable manner.

In a refinement of the invention, the first locking element is designed as the deformation element and is connected fixedly to the steering column. The second locking element is preferably of rigid design such that it engages positively and frictionally on the first locking element, as the latter is being deformed, and in this case fixes the first locking element, including the steering column, on the body.

In a further refinement of the invention, in the direction of the steering-column axis, the deformation element is of a length which at least approximately corresponds to the adjustment travel of the steering column in the axial direction. The steering column can thereby be arranged such that it can be adjusted relative to the second locking element on the body, the locking element on the body engaging on a different point on the deformation element when the steering column is in a different relative position.

In a further refinement of the invention, the deformation element is designed as a hollow profile, in particular consisting of a highly elastic rubber material. By this means, particularly reliable, flexible ductile behavior of the deformation element is ensured.

In a further refinement of the invention, the second locking element is secured in a pivotable manner to the motor-vehicle body. As a result, the second locking element can be adjusted in a simple manner by being pivoted against the first locking is element.

In a further refinement of the invention, the second locking element has a lug which presses it into the first locking element. In this case, the first locking element is preferably designed as the highly elastic deformation element and the second locking element as a dimensionally stable cam.

In a further refinement of the invention, the second locking element is assigned at least one stop which is secured on the body and against which the second locking element abuts in its locking position. Since the positive engagement of the second locking element in-the first locking element, which is designed as the deformation element, does not suffice on its own to unambiguously and mutually secure the elements, a further stop which is secured on the body constitutes an additional means of fixing for the locking device. Particularly when a second locking element is secured in a pivotable manner to the motor-vehicle body, the stop which is secured on the body serves to limit the pivoting movement, with the result that the second locking element is retained in its locking position.

In a further refinement of the invention, the second locking element can be adjusted with respect to the motor-vehicle body, in the direction of the adjustment travel of the steering column, and can be secured separately. This enables the second locking element to track an adjustment of the steering column, so that it can in each case be positioned opposite the first locking element.

According to a second aspect, the invention provides a method for making a locking device for releasably securing an adjustable steering column to a motor-vehicle body. This method comprises providing two locking elements: a first locking element designed as an elastically ductile deformation element and a second locking element with means for deforming the deformation element into a locking position. One of the two locking elements is attached to the steering column and the other locking element is attached to the motor-vehicle body.

Another aspect of the invention provides a method for releasably securing an adjustable steering column to a motor-vehicle body. This method comprises attaching a locking element to the steering column and attaching another locking element to the motor-vehicle body. One of the two locking elements is designed as an elastically ductile deformation element that can be deformed in the locking position by means of the other locking element with resultant force and/or form locking of the steering column to the motor-vehicle body.

Other objects, advantages and novel features of the present invention will become apparent from the following

DETAILED DESCRIPTION OF THE DRAWINGS

Figure 1:
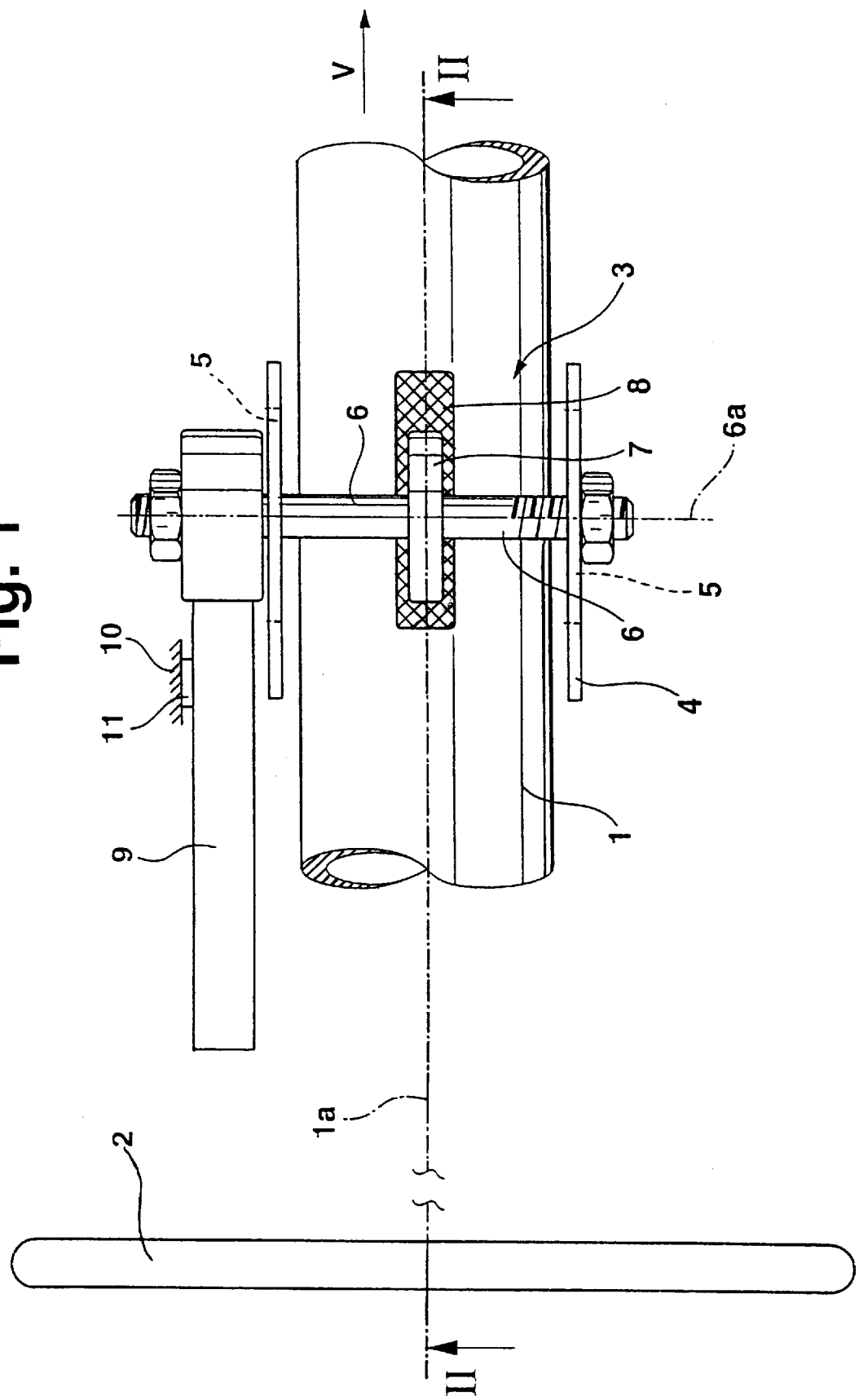
FIG. 1 shows, schematically in a plan view, a locking device according to the invention for a motor-vehicle steering column.

FIG. 1 shows a section of a steering column 1 of a motor vehicle, which is mounted on the motor-vehicle body 10 in a manner such that it can be displaced axially along its axis 1a. The steering column consists of an outer steering-column tube and a steering shaft (not shown). A steering wheel 2 is arranged on that side of the steering shaft which faces the passenger compartment. To axially fix the steering column 1, a locking device 3, which is accessible to the driver, is arranged between the steering column 1 and motor-vehicle body 10. The locking device 3 can be adjusted between a release position (not shown), in which the steering column 1 can be displaced, and a locking position (shown in FIGS. 1 and 2) in which the steering column is fixed to the motor-vehicle body.

The locking device 3 comprises a first locking element 8 in the form of a deformation element which is arranged fixedly on the steering column 1 and can be displaced with the latter. This deformation element 8 is designed as a hollow profile consisting of a highly elastic rubber material, and can be deformed reversibly. It has a longitudinal extent L in the direction of the axis 1a of the steering column 1, which extent is greater than the displacement travel of the steering column 1 with respect to the motor-vehicle body 10. It is therefore arranged opposite a second locking element 7 in every position of the steering column 1.

Figure 2:
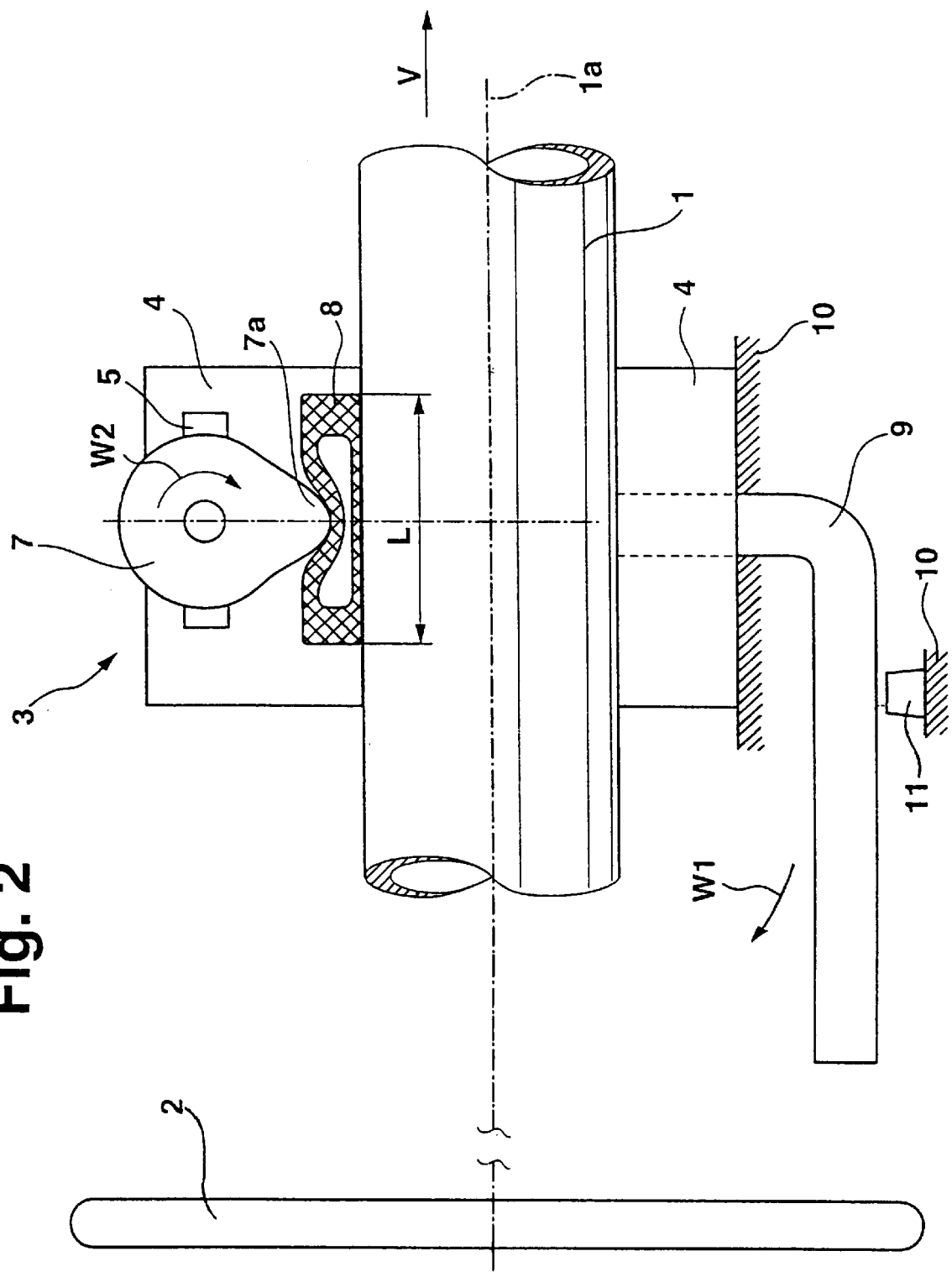
FIG. 2 shows, schematically, a side view of the locking device according to FIG. 1.

FIG. 2 illustrates that the second locking element 7 forms a further, essential component of the locking device 3 and is fastened fixedly on a bearing bolt 6, which is mounted on a retaining fork 4 on the body in the manner such that it can rotate about its axis 6a. The second locking element 7 has a cam-like form with a lug 7a which protrudes radially with respect to the axis 6a. It is formed from a substantially stronger material than the deformation element 8, in particular a metal, so that when appropriately positioned its lug 7a presses into the deformation element 8 and elastically deforms the latter. The rotatably mounted bearing bolt 6 is arranged, with respect to the retaining fork 4 which is secured on the vehicle. The retaining fork 4 is provided with two slots 5 which lie opposite each other in a manner such that it can additionally be displaced in the direction of the axis 1a of the steering column. The bearing bolt 6 is furthermore assigned an actuating lever 9 which is connected fixedly to it and can be pivoted with it and which can be actuated manually by the motor-vehicle driver. The actuating lever 9 is assigned a stop 11 which is secured on the body and permits the actuating lever 9, starting from the locking position shown in the figures, to move exclusively in the direction of the arrow W1.

In the shown locking position of the locking device 3, the two locking elements 7 and 8 are in positive engagement, the first locking element, in the form of the deformation element 8, being at the same time pressed fixedly against the steering column 1. This locking position can be released by the actuating lever 9 being pivoted in the direction of the arrow W1 and the second locking element 7 being rotated in the direction of the arrow W2. This disengages the second locking element 7 from the deformation element 8, which then resumes its undeformed form. This releases the axial movement of the steering column 1.

Starting from the position shown in the Figures, the axial movement of the steering column is possible both in the direction of the arrow V and in the opposite direction. This displacement travel is in each case smaller in both directions than half of the length L of the deformation element 8, so that in each position of the steering shaft 1 a section of the deformation element comes to lie adjacent to the locking element 7 and it is possible for the lug 7a to engage into the deformation element 8. In the event of a displacement travel of the steering column 1 exceeding the above, a provision is made for the bearing bolt 6 to be displaced at the same time within the slots 5 in the corresponding direction.

With the aid of the locking device 3 according to the invention the steering column 1 can be adjusted and locked in an infinitely variable manner with respect to the motor-vehicle body 10. The lug 7a of the locking element 7 can be pressed into the deformation element 8 in any position of the steering column 1. If an axial force is introduced into the steering column 1, in particular in the direction of the arrow V, after a slight, sprung movement of the steering column 1 a bead builds up in the deformation element 8, which bead blocks further movement of the steering column 1 with respect to the second locking element 7. This type of event occurs, for example, during a vehicle collision resulting in triggering of an airbag which is arranged in the steering wheel 2 and exerts a considerable recoil impulse on the steering column 1.

The stop 11 prevents the actuating lever 9 from pivoting counter to the direction of the arrow W1 and prevents the locking element 7 from rotating counter to the direction of the arrow W2. This ensures that the positive engagement of the locking elements 7 and 8 is not cancelled out by a slight displacement of the locking or deformation element 8 in the direction of the arrow V and by an associated rotation of the locking element 7.

In a modified exemplary embodiment, the first locking element 8, which is designed as the deformation element, is retained on the body and is not connected fixedly to the steering column 1. In a locking position of the locking device 3, said element 8 engages form and/or force lockly on the steering column 1. In the release position of the locking device 3 said element is lifted off the steering column 1, so that the latter can be displaced freely. As a result, matching of the length L of the deformation element 8 to the length of the displacement travel of the steering column is omitted.

In a further modified exemplary embodiment, two or more locking devices 3 are arranged on the steering column 1.

In a further modified exemplary embodiment, the first locking element 8, which serves as the deformation element, is arranged secured on the body, while the second locking element 7 is secured in a pivotable manner to the steering column 1.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A locking device for releasably securing an adjustable steering column to a motor-vehicle body, comprising:

two locking elements, where one of the two locking elements is attached to the steering column and the other is attached to the motor-vehicle body, wherein the two locking elements are adjustable in relation to each other between a release position, which allows the steering column to be adjusted, and a locking position, which secures the steering column and wherein further at least one of the two locking elements is designed as an elastically ductile deformation element that can be deformed in the locking position by means of the other locking element with resultant force or form locking of the steering column to the motor-vehicle body, and wherein the deformation element is connected fixedly to the steering column.

2. The locking device of claim 1, wherein the deformation element is of a length which at least approximately corresponds to the adjustment travel of the steering column in the axial direction of the steering-column axis.

3. The locking device of claim 1, wherein the deformation element is designed as a hollow profile.

4. The locking device of claim wherein the deformation element consists of a highly elastic rubber material.

5. The locking device of claim 1, wherein the other locking element is secured in a pivotable manner to the motor-vehicle body.

6. The locking device of claim 1, wherein the other locking element has a lug which presses into the at least one locking element.

7. The locking device of claim 1, further comprising at least one stop which is secured on the motor-vehicle body and locks the other locking element in the locking position.

8. The locking device of claim 1, wherein the other locking element can be adjusted with respect to the motor-vehicle body, in the direction of the adjustment travel of the steering column, and can be secured separately.

9. The locking device of claim 1, wherein the other locking element can be adjusted with the steering column with respect to the motor-vehicle body.

10. A locking device for releasably securing an adjustable steering column to a motor-vehicle body, comprising:

two locking elements, where one of the two locking elements is attached to the steering column and the another is attached to the motor-vehicle body, wherein the two locking elements are adjustable in relation to each other between a release position, which allows the steering column to be adjusted, and a locking position, which secures the steering column and wherein further at least one of the two locking elements is designed as an elastically ductile deformation element that can be deformed in the locking position by means of the other locking element with resultant force and form locking of the steering column to the motor-vehicle body, and wherein the deformation element is connected fixedly to the steering column.

11. A locking device for releasably securing an adjustable steering column to a motor-vehicle body, comprising:

two locking elements, where one of the two locking elements is attached to the steering column and the another is attached to the motor-vehicle body, wherein at least one of the two locking elements is designed as an elastically ductile deformation element that can be deformed in the locking position by means of the other locking element with resultant force or form locking of the steering column to the motor-vehicle body, and wherein the deformation element is connected fixedly to the steering column.

12. A method for making a locking device for releasably securing an adjustable steering column to a motor-vehicle body, comprising:

providing two locking elements, a first locking element designed as an elastically ductile deformation element and a second locking element with means for deforming the deformation element into a locking position; and attaching one of the two locking elements to the steering column and attaching the other locking element to the motor-vehicle body, and wherein the deformation element is connected fixedly to the steering column.

13. The method of claim 12, wherein the deformation element is designed as a hollow profile.

14. The method of claim 13, wherein the deformation element consists of a highly elastic rubber material.

15. The method of claim 12, wherein the second locking element is secured in a pivotable manner to the motor-vehicle body.

16. The method of claim 12, wherein the second locking element has a lug which presses into the deformation element.

17. The method of claim 12, further comprising at least one stop which is secured on the motor-vehicle body and locks the second locking element in the locking position.

18. The method of claim 12, wherein the second locking element can be adjusted with respect to the motor-vehicle body, in the direction of the adjustment travel of the steering column, and can be secured separately.

19. The method of claim 12, wherein the second locking element can be adjusted with the steering column with respect to the motor-vehicle body.

20. A method for releasably securing an adjustable steering column to a motor-vehicle body, comprising:

attaching a locking element to the steering column and attaching another locking element to the motor-vehicle body, wherein at least one of the two locking elements is designed as an elastically ductile deformation element that can be deformed in the locking position by means of the other locking element with resultant force or form locking of the steering column to the motor-vehicle body, and wherein the deformation element is connected fixedly to the steering column.

21. A locking device for releasably securing an adjustable steering column to a motor-vehicle body, comprising:

two locking elements, where one of the two locking elements is attached to the steering column and the other is attached to the motor-vehicle body, wherein the two locking elements are adjustable in relation to each other between a release position, which allows the steering column to be adjusted, and a locking position, which secures the steering column and wherein further at least one of the two locking elements is designed as an elastically ductile deformation element that can be deformed in the locking position by means of the other locking element with resultant force or form locking of the steering column to the motor-vehicle body, and wherein the deformation element is of a length which at least approximately corresponds to the adjustment travel of the steering column in the axial direction of the steering-column axis.

22. A locking device for releasably securing an adjustable steering column to a motor-vehicle body, comprising:
- two locking elements, where one of the two locking elements is attached to the steering column and the other is attached to the motor-vehicle body,
- wherein the two locking elements are adjustable in relation to each other between a release position, which allows the steering column to be adjusted, and a locking position, which secures the steering column and wherein further at least one of the two locking elements is designed as an elastically ductile deformation element that can be deformed in the locking position by means of the other locking element with resultant force or form locking of the steering column to the motor-vehicle body, and
- wherein the deformation element is designed as a hollow profile.

23. The locking device of claim 22, wherein the deformation element consists of a highly elastic rubber material.

24. A locking device for releasably securing an adjustable steering column to a motor-vehicle body, comprising:
- two locking elements, where one of the two locking elements is attached to the steering column and the other is attached to the motor-vehicle body,
- wherein the two locking elements are adjustable in relation to each other between a release position, which allows the steering column to be adjusted, and a locking position, which secures the steering column and wherein further at least one of the two locking elements is designed as an elastically ductile deformation element that can be deformed in the locking position by means of the other locking element with resultant force or form locking of the steering column to the motor-vehicle body, and
- wherein the other locking element is secured in a pivotable manner to the motor-vehicle body.

25. A locking device for releasably securing an adjustable steering column to a motor-vehicle body, comprising:
- two locking elements, where one of the two locking elements is attached to the steering column and the other is attached to the motor-vehicle body,
- wherein the two locking elements are adjustable in relation to each other between a release position, which allows the steering column to be adjusted, and a locking position, which secures the steering column and wherein further at least one of the two locking elements is designed as an elastically ductile deformation element that can be deformed in the locking position by means of the other locking element with resultant force or form locking of the steering column to the motor-vehicle body, and, further comprising at least one stop which is secured on the motor-vehicle body and locks the other locking element in the locking position.

26. A method for making a locking device for releasably securing an adjustable steering column to a motor-vehicle body, comprising:
- providing two locking elements, a first locking element designed as an elastically ductile deformation element and a second locking element with means for deforming the deformation element into a locking position; and
- attaching one of the two locking elements to the steering column and attaching the other locking element to the motor-vehicle body,
- wherein the deformation element is designed as a hollow profile.

27. The method of claim 26, wherein the deformation element consists of a highly elastic rubber material.

28. A method for making a locking device for releasably securing an adjustable steering column to a motor-vehicle body, comprising:
- providing two locking elements, a first locking element designed as an elastically ductile deformation element and a second locking element with means for deforming the deformation element into a locking position, and
- wherein the second locking element is secured in a pivotable manner to the motor-vehicle body.

29. A method for making a locking device for releasably securing an adjustable steering column to a motor-vehicle body, comprising:
- providing two locking elements, a first locking element designed as an elastically ductile deformation element and a second locking element with means for deforming the deformation element into a locking position, and
- at least one stop which is secured on the motor-vehicle body and locks the second locking element in the locking position.

* * * * *